United States Patent
Schaffner et al.

(10) Patent No.: US 10,301,106 B2
(45) Date of Patent: May 28, 2019

(54) MATERIAL STORAGE UNIT FOR USE IN SUBTERRANEAN FORMATION OPERATIONS

(71) Applicant: Halliburton Energy Services, Inc., Houston, TX (US)

(72) Inventors: Austin Carl Schaffner, Duncan, OK (US); Bryan Chapman Lucas, Duncan, OK (US); Wesley John Warren, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 108 days.

(21) Appl. No.: 15/520,411

(22) PCT Filed: Dec. 3, 2014

(86) PCT No.: PCT/US2014/068290
§ 371 (c)(1),
(2) Date: Apr. 19, 2017

(87) PCT Pub. No.: WO2016/089383
PCT Pub. Date: Jun. 9, 2016

(65) Prior Publication Data
US 2017/0313497 A1    Nov. 2, 2017

(51) Int. Cl.
*B60P 3/22*      (2006.01)
*B65D 90/34*    (2006.01)
*B65D 88/32*    (2006.01)
*B65D 90/48*    (2006.01)

(52) U.S. Cl.
CPC ............ *B65D 88/32* (2013.01); *B65D 90/34* (2013.01); *B65D 90/48* (2013.01); *B60P 3/2255* (2013.01)

(58) Field of Classification Search
CPC ........ B65D 88/32; B65D 90/48; B65D 90/34; B60P 3/2255
See application file for complete search history.

(56) References Cited

U.S. PATENT DOCUMENTS

| | | | |
|---|---|---|---|
| 4,312,388 | A | 1/1982 | Hager et al. |
| 8,636,832 | B2 | 1/2014 | Stutzman et al. |
| 8,663,371 | B1 | 3/2014 | Wann |
| 2009/0078410 | A1 | 3/2009 | Krenek et al. |
| 2011/0103901 | A1 | 5/2011 | Hetcher et al. |
| 2013/0161354 | A1 | 6/2013 | Oren |
| 2013/0164112 | A1 | 6/2013 | Oren |

OTHER PUBLICATIONS

International Search Report and Written Opinion for PCT/US2014/068290 dated Aug. 25, 2015.

*Primary Examiner* — Jason K Niesz
(74) *Attorney, Agent, or Firm* — McGuireWoods LLP

(57) ABSTRACT

A material storage unit including a bin having a bottom end, a top end, and a sidewall extending therebetween and defining an interior configured to hold particulates, where a portion of the sidewall defines an angular air flow vent having a top air inlet and a bottom air inlet. The material storage unit further includes a fill line inlet extending through one or both of the bottom end of the bin or the sidewall of the bin and in fluid communication with the interior, a venting outlet extending through one or both of the top end of the bin or the sidewall of the bin and in fluid communication with the interior, and a discharge outlet extending through the bottom end of the bin and in fluid communication with the interior.

20 Claims, 5 Drawing Sheets

MATERIAL STORAGE UNIT FOR USE IN SUBTERRANEAN FORMATION OPERATIONS

BACKGROUND

The embodiments herein relate generally to material storage units for use in subterranean formation operations and, more particularly, to particulate dust control and fill management of material storage units for use in subterranean formation operations.

Subterranean wells (e.g., hydrocarbon producing wells, water producing wells, and the like) are often stimulated by hydraulic fracturing treatments where fractures are formed in a subterranean formation and held open with solid particulates (referred as "proppant") to enhance fluid conductivity through the formation. Often, many tons of particulates are used in a fracturing operation. Such particulates are also used, among other operations, during gravel packing operations to control sand production in a subterranean formation during production, for example. As used herein, the term "particulate" refers collectively to proppant particulates, gravel particulates, and any other solid particulates that may be used in a subterranean formation operation.

When preparing particulates at the surface of the well site for use in an operation, large amounts of dust may be created by the movement of the particulates, thereby creating inhalation hazards. For example, a common particulate (e.g., proppant particulate, gravel particulate, and the like) is sand, which produces silica dust that is associated with the lung disease silicosis, or Potter's rot. Silicosis is a type of pneumoconiosis that manifests as inflammation and scarring in forms of nodular lesions in the upper lobes of the lungs, which may result in severe difficulties breathing and low blood oxygen levels.

A material storage and transport unit (collectively referred to herein as "material storage unit"), for example, is a piece of particulate-handling equipment that can produce dust during the transfer or movement of particulates. The material storage unit may also be used to transport the particulates. For example, generally, particulates are transferred from a manufacturer or other storage containment to a material storage unit for transport and storage at the well site. The material storage unit is typically equipped with a pneumatic or gravity fed discharge outlet for conveying the particulates to a location outside of the material storage unit, such as a mixer. The mixer is generally where water and other additives (e.g., viscosifiers, surfactants, friction reducers, resins, tackifiers, and the like) may be mixed with the particulates, such as to form a slurry for delivery to a downhole location (e.g., to stimulate a subterranean formation).

Material storage units are typically configured such that the particulates are filled into one or more bins in the unit with one or more pneumatic fill line inlet in each bin. The pneumatic fill line inlet may extend from the bottom of each bin in the material storage unit and pneumatically convey the particulates into the bin. As the pumping takes place, a significant amount of dust is typically produced. To monitor the contents of the material storage unit and ensure that the bins in the material storage unit are not overfilled, operators typically observe the filling process from the top of the bin, where a hinged hatch may be present that may be opened to view the contents of the bins. However, the dust may accumulate and escape through the hatch thereby exposing operators to significant dust. The significant amount of dust particularly when coupled with worker proximity during operation creates a substantial exposure risk.

When dust control measures are used, they are most commonly in the form of the hatch previously discussed, which may be ineffective as a consequence of the need to open the hatch despite the produced dust. In some instances, a vacuum system with a hose may be used, but a vacuum connection is required for each individual bin and dust exposure to the operator is not eliminated, as the operator still must monitor the filling process through an opening in the bin to ensure that overfilling does not occur.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
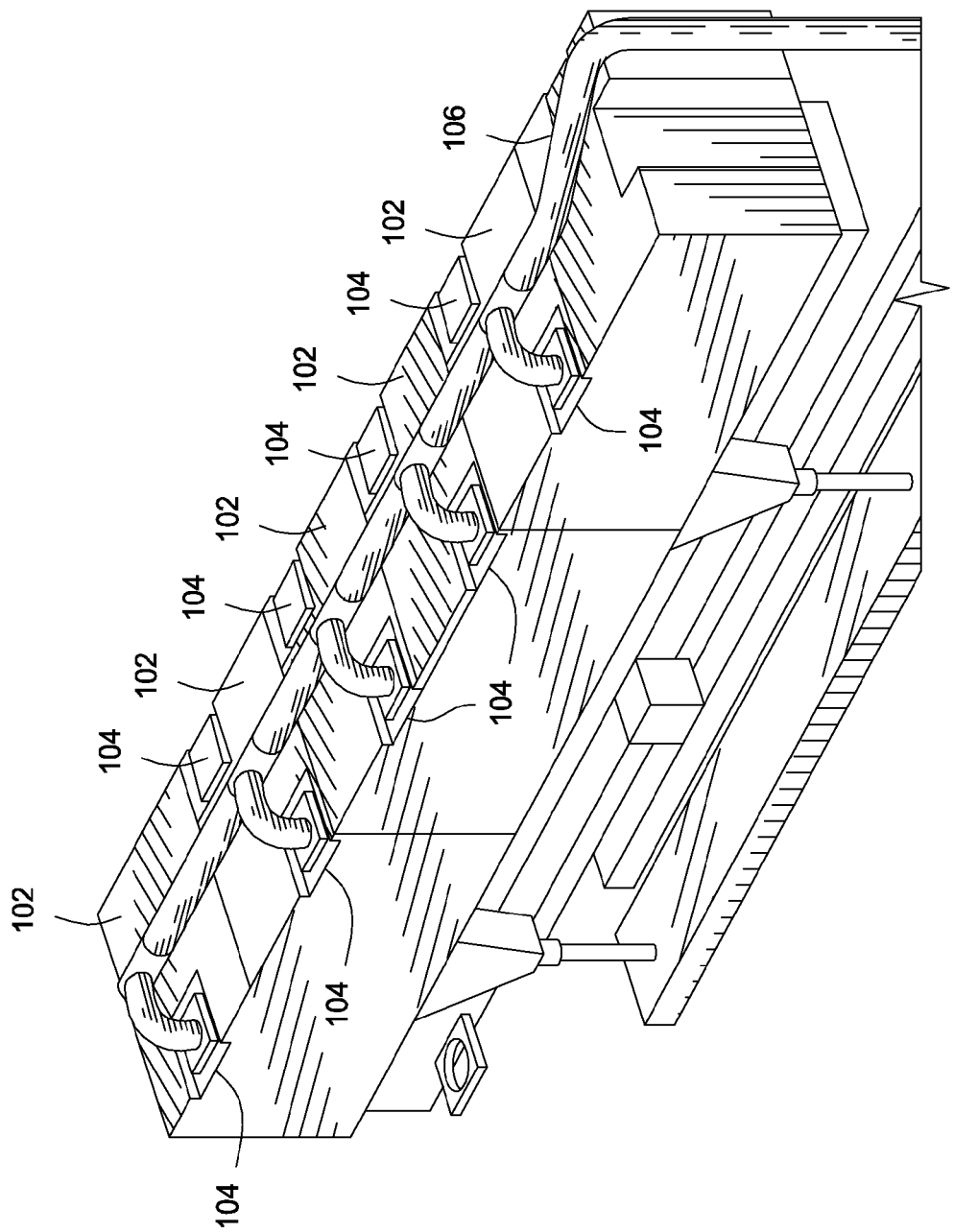
FIG. 1A illustrates the exterior of a traditional material storage unit with a temporary venting mechanism installed.

The embodiments herein relate generally to material storage units for use in subterranean formation operations and, more particularly, to particulate dust control and fill management of material storage units for use in subterranean formation operations.

The material storage unit and methods of use in the various embodiments described herein permit filling of the material storage unit with particulates while eliminating or significantly reducing operator exposure to generated dust. In particular, the embodiments herein provide a ventilation system using angular air flow vents in the material storage unit without the need for operator exposure to generated dust. Where multiple bins are present in a material storage unit, the ventilation system communicates between each bin. Moreover, an automated fill sensor may be utilized in the material storage unit to ensure that the material storage unit is not overfilled with particulates and, should overfilling occur, the ventilation system dually functions as an overflow mechanism.

The material storage units according to the embodiments herein provide other benefits in addition to reducing or eliminating operator exposure to dust and providing an automated means to determine fill level. They also eliminate the need for previously used venting mechanisms connected to each bin in a material storage unit because the bins are in fluid communication by virtue of the venting mechanism. Such venting mechanisms have previously been externally affixed, requiring significant operator time to install and remove each time the material storage unit is transported to another location, such as to meet road requirements. Removal of the venting mechanisms also reduces operator time previously used to clean the vent tubing after filling or an operation.

Although some embodiments described herein are illustrated by reference to subterranean formation operations, the methods and apparatuses disclosed herein may be used in any non-subterranean formation operation that may benefit from a particulate material storage unit having an internal venting mechanism (that also operates as an overflow mechanism), and in some instances a fill sensor. Such operations may be performed in any industry including, but not limited to, oil and gas, mining, chemical, pulp and paper, aerospace, automotive, asphalt and/or concrete (e.g., portable paving applications), and the like.

Unless otherwise indicated, all numbers expressing quantities of ingredients, properties such as angled components, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Referring now to FIG. 1A, illustrated is a traditional material storage unit 100. As depicted, the material storage unit comprises five separate bins 102. As is traditionally standard, the bins 102 are not in fluid communication with one another, each sealed from the other and having a separate particulate fill line inlet and discharge outlet (not shown). As shown, each bin 102 has a hatch 104 that is able to be opened. The hatch 104 may traditionally be opened by an operator to observe filling of particulates and is a location in which substantial dust may escape the material storage unit 100 during particulate filling. Although depicted as an opaque hatch, the hatch may be of a substantially transparent or translucent material to aid in viewing particulate filling operations while the hatch is closed. As mentioned previously, however, the substantial dust that accumulates often precludes the ability to adequately monitor filling operations through a transparent hatch.

A venting mechanism having ducting 106 extends from an air source (e.g., a ventilation fan) (not shown) and pulls a vacuum in each bin 102. In some embodiments, the venting mechanism 106 may be attached to each bin 102 through the hatch 104 thereof, although such is not required, as shown in FIG. 1A. The vacuum may be used as a dust control measure, as previously discussed. Because each of the bins 102 is separate from each other, the ducting 106 must be attached to each bin 102 having particulates filled therein. The ducting 106 is large and must be removed from the material storage unit 100 each time for transport and set up at a new location, thus requiring substantial space to house and travel with the venting mechanism and operator time to install and uninstall the venting mechanism at each job site or at separate locations in each job site.

Figure 1B:
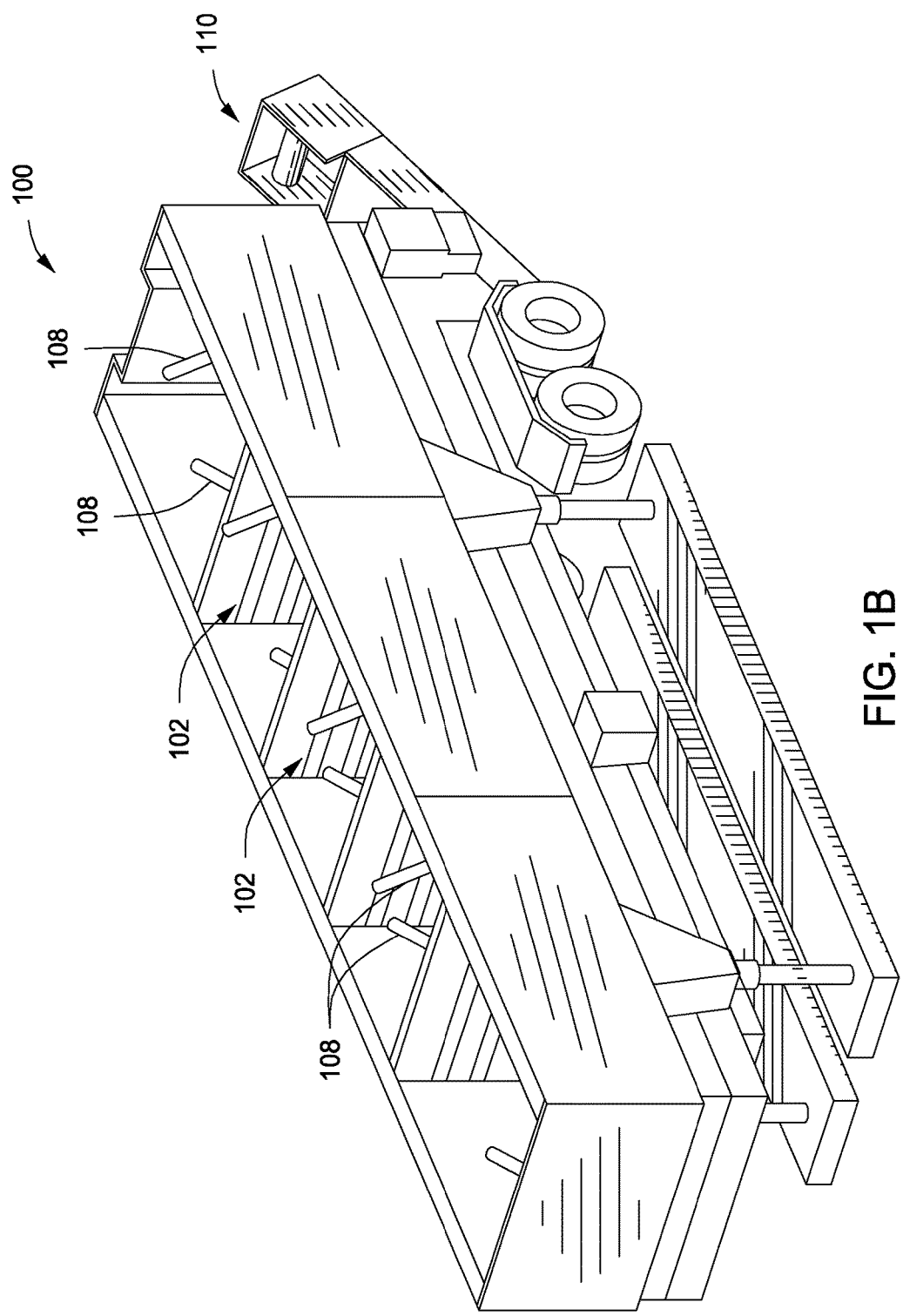
FIG. 1B illustrates the interior of a traditional material storage unit.

Referring now to FIG. 1B, with continued reference to FIG. 1A, illustrated is the interior of the material storage unit 100. As explained with reference to FIG. 1A, each bin 102 is separate and any fluid communication between the bins is minimal, if at all. Each bin 102 comprises a top end (shown in FIG. 1A), a bottom end (not shown) and a sidewall extending therebetween, defining an interior capable of holding particulates therein. As depicted in FIG. 1A, the bin 102 may have a cube-shaped interior. Each bin 102 is shown having two fill line inlets 108 through which particulates are pumped into the bins 102 from the bottom end or sidewall of the material storage unit 100. Any number of fill line inlets 108 (including one or greater than two) may be used depending on the material storage unit 100. A discharge outlet (not shown) forms part of the materials storage unit 100 for discharging the particulates from the bottom of the bins 102 and for use in an operation, such as a fracturing operation when the particulates are proppant particulates or a gravel packing operation when the particulates are gravel or other gravel packing particulates. The discharge outlet may be located in each bin and discharge the particulates onto a conveyor 110 for use in the subterranean formation operation.

For illustration, the venting mechanism and fill sensor described herein are explained with reference to the general structure of the material storage unit 100 of FIGS. 1A and 1B, and may have all of the aforementioned components in any shape, size, or number, without departing from the scope of the present disclosure. However, the general configuration of the material storage unit 100 is not limiting. For example, the material storage unit described herein may be any size, shape, or configuration, including horizontally disposed or vertically disposed, without departing from the scope of the present disclosure. Moreover, any size, shape, and number of bins may be present as part of the material storage unit. For example, the material storage unit may have a single bin, or between two and five bins, or between five and ten bins, or even more, without departing from the scope of the present disclosure. The bins may be cubic, round, rectangular, cylindrical, polygonal, spheroid (e.g., prolate spheroid), or otherwise shaped. Indeed, a benefit of the venting mechanism and automated fill sensor of the present disclosure is that it may be adapted for use with any type of material storage unit designed or otherwise commercially available. Additionally, any number, shape, and size of the fill line inlet, hatch, discharge outlet, or any other portion of the material storage described with reference to FIGS. 1A,B or otherwise described herein are suitable for use in the embodiments of the present disclosure.

Figure 2:
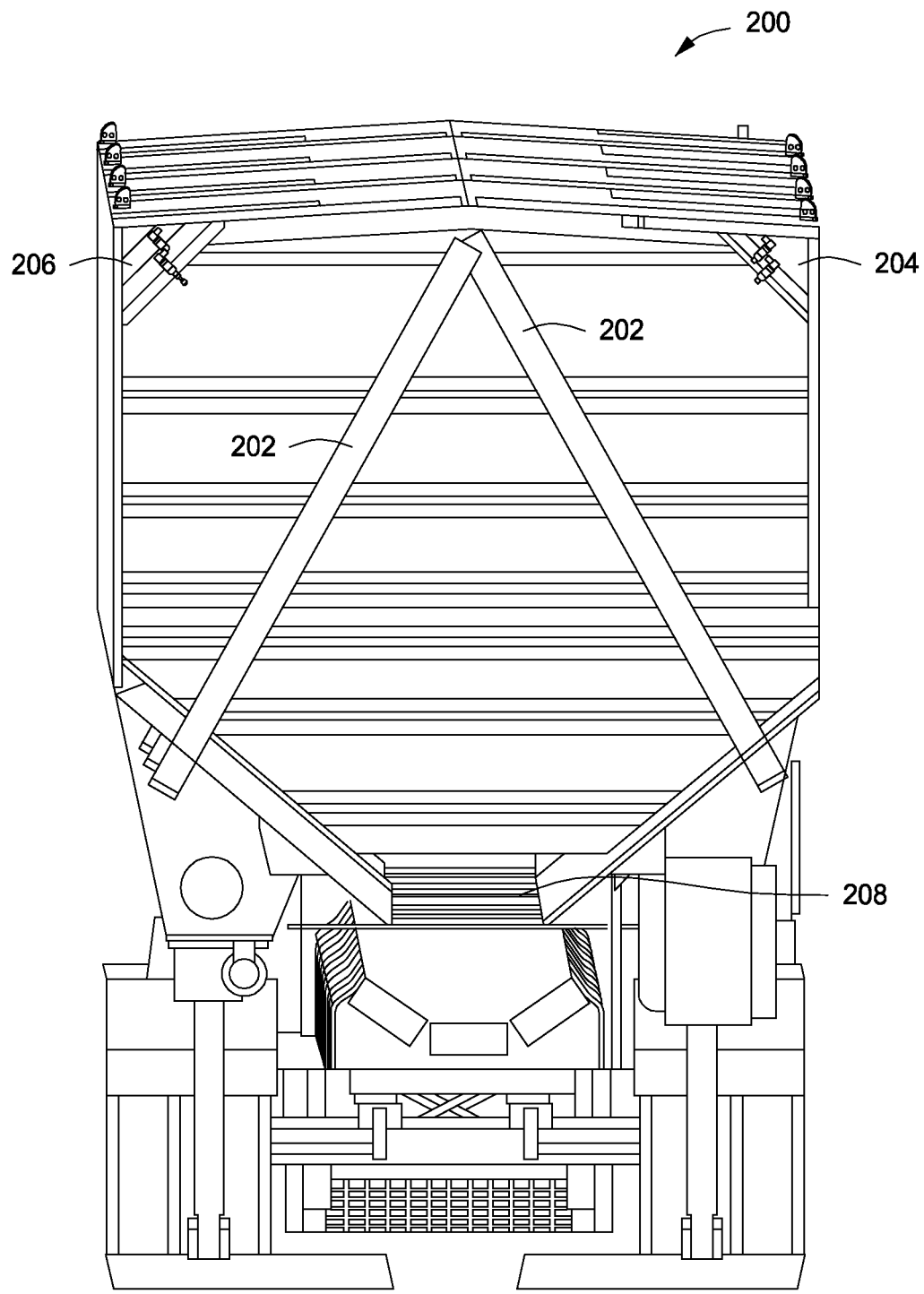
FIG. 2 illustrates a cut-away of the back portion of a material storage unit having angular air flow ventilation and fill sensors according to one or more embodiments of the present disclosure.

Referring now to FIG. 2, illustrated is an exemplary location for the venting mechanism and the fill sensors of the present disclosure. Material storage unit 200 may be substantially similar to material storage unit 100 of FIGS. 1A,B. As shown, the back portion of the material storage unit 200 is cut-away in order to view the inside of the bins (not labeled). As shown, two fill line inlets 202 extend through the sidewall of the bin and are in fluid communication with the interior of the bin(s). As shown, each fill line inlet 202 has two ends, a first end located outside of the interior of the bin and configured to receive particulates from a source, such as by pneumatic conveyance through a hose connected to the first end of the fill line inlet 202. The fill line inlet 202 also has a second end that is located inside of the interior of the bin through which the particulates are deposited into the bin.

While the fill line inlets 202 in FIG. 2 extend through the sidewall of the bin, a fill line inlet 202 may similarly be configured to extend through the bottom end of the bin, without departing from the scope of the present disclosure. Moreover, only one or more than two fill line inlets 202, such as between two and five, or between five and ten, or more may be present in a single bin according to the embodiments described herein. The height of the second end of the fill line inlet 202 is also variable and may generally be located at or above the threshold fill location for filling the particulates in the bin. Such location may generally be located at less than or equal to a top ½ portion of the sidewall proximal to the top end of the bin. In other embodiments, the second end of the fill line inlet 202 may be located at less than or equal to a top ¼ portion of the sidewall proximal to the top end of the bin, or even higher. Other locations may also be feasible, including higher than the top ¼ portion that is still suitable for ejecting particulates into the interior of the bin. The location of the second end of the fill line inlet 202 may depend on a number of factors including, but not limited to, the amount of particulates required for a particular operation, the type of particulates used (e.g., whether substantial dust is expected), the weight of the particulates used (e.g., whether the filling operation will be slowed due to piling of the particulates on the second end of the fill line inlet 202), and the like.

As explained above, the bin(s) forming part of the material storage unit 200 is comprised of a bottom end, a top end, and a sidewall extending therebetween and defining an interior. As shown in FIG. 2, the venting mechanism of the embodiments described herein may comprise an angular air flow vent 204 (two shown) defined by a portion of the sidewall of the bin. As depicted, the angular air flow vents 204 are shown as a corner of the cube-shaped bin, but the angular air flow vents 204 may be located at any portion of the sidewall provided that they are in substantially identical locations for each bin located in a particular material storage unit, such that each bin is in fluid communication with all other bins in the material storage unit through the angular air flow vents 204. While two angular air flow vents 204 are shown in FIG. 2, it will be appreciated that a single angular air flow vent or greater than two angular air flow vents may be defined in the sidewall of each bin in a material storage unit, without departing from the scope of the present disclosure.

The sidewall of the bin may define the angular air flow vent(s) at any location along the sidewall. Generally, because the angular air flow vents are designed to vent air and provide dust control, the angular air flow vent may preferably be located at less than or equal to a top ½ portion of the sidewall proximal to the top end of the bin. In other embodiments, the angular outlet may be located at less than or equal to a top ¼ portion of the sidewall proximal to the top end of the bin, or even higher. Other locations may also be feasible, including higher than the top ¼ portion or any location between the top ½ portion and the apex of the sidewall.

The angular air flow vents 204 allow air to freely move through the entire material storage unit 200, regardless of the number of bins located therein. Such air flow may occur naturally by use of a venting outlet (not shown) extending through one or both of the top end of one or more bins therein or the sidewall of one or more bins therein, such that the venting outlet is in fluid communication with the interior of the bins forming the material storage unit. For example, the venting outlet of the embodiments described herein may be substantially similar to the vacuum mechanism 106 of FIG. 1A. However, the venting outlet of the present disclosure need not be connected to each bin in the material storage unit because the angular air flow vents 204 permit fluid communication therebetween (e.g., only a single connection location is required, although multiple connection locations may be permitted such as that depicted in FIG. 1A, without departing from the scope of the present disclosure). In some embodiments, the venting outlet (not shown) may have two ends, wherein a first end is located outside of the interior of the bin or material storage unit and the second end is located inside the interior and both the first end and the second end of the venting outlet are open to air flow. In some instances, the second end of the venting outlet may be in fluid communication with the material storage unit having the angular air flow vents described herein through the top end (as shown in FIG. 1A with respect to 106) or the upper portion of the sidewall of the bin. The upper portion of the sidewall may include at less than or equal to a top ½ portion of the sidewall proximal to the top end of the bin, or equal to a top ¼ portion of the sidewall proximal to the top end of the bin, or even higher. Other locations may also be feasible, including higher than the top ¼ portion or any location between the top ½ portion and the apex of the sidewall.

In some instances, the first end of the venting outlet may be connected to a vacuum source (not shown) in order to maintain a vacuum in the material storage unit and better control dust generation. The vacuum source may include ventilation fan that pulls a vacuum through the venting outlet and air circulates by virtue of the design of the angular air flow vents 204, discussed in greater detail below. Suitable ventilation fans may include, but are not limited to an axial flow fan, a centrifugal flow fan, a cross flow fan, and any combination thereof.

As shown in FIG. 2, the angular air flow vent 204 may further comprise a fill sensor 206. Although depicted on the angular air flow vent 204, the fill sensor 206 may be located at any location on the interior of the sidewall corresponding to at least a threshold fill location, although, as described below, additional fill sensors 206 may be located at other locations that do not correspond to a threshold fill location. As used herein, the term "threshold fill location" corresponds to the maximum fill amount in volume, corresponding to a location on the sidewall of the bin, for a particular material storage unit, particulate, and/or operation. The threshold fill location may be dependent on the type of material storage unit, the type of particulates being filled into a particular bin, the type of operation being performed, and the like. For example, in some embodiments, the fill sensor may be located at less than or equal to a top ½ portion of the sidewall proximal to the top end of the bin, at less than or equal to a top ¼ portion, higher than the top ¼ portion including the apex of the sidewall, or any location between the top ½ portion and the apex of the sidewall.

The fill sensor 206 may be disposed on the angular air flow vent 204 or the sidewall by any means suitable for ensuring that the fill sensor does not dislodge during operations (e.g., filling operations). For example, the fill sensor may be mechanically disposed (e.g., by using screws, bolts, clamps, and the like), adhesively disposed, made integral to the sidewall, and the like, and any combination thereof. Conditions of the material storage unit (e.g., the material making up the unit), the external conditions of operation (e.g., temperature, humidity), may influence the choice of means to affix the fill sensor 206.

The fill sensor 206 may be configured to output an output signal when particulates being filled into a bin of a material storage unit exceed the threshold fill location. The output signal may be any signal that notifies an operator to cease filling operations or perform another operation related to the material storage unit (e.g., begin discharging particulates). For example, in some embodiments, the output signal may be a visual output signal, an audible output signal, a detectable electronic signal, and any combination thereof. An operator may detect the output signal and react by performing a particular operation, such as ceasing filling operations to ensure overfilling does not occur. In other operations, the output signal may be electronically or otherwise in communication with filling equipment, wherein the output signal electronically communicates with the filling equipment or a component of the filling equipment to cease operations or perform other operations. That is, the output signal may be designed to shut off the filling equipment or prohibit further filling into the material storage unit without the need for operator intervention. For example, an inlet valve (not shown) on the fill line inlet 202 may be automatically closed, an outlet valve on the filling equipment (not shown) that supplies the particulates may be closed automatically, the compressor on the filling equipment (not shown) may be shut off automatically, a valve that causes the filling machine to begin filling in a new bin could automatically be opened and the valve associated with the filled bin closed automatically (e.g., automatic sequential filling of bins), and the like. In other embodiments, the output signal may be communicated electrically or by other means to a computer having a general processor and storage medium, wherein the output signal is logged or tracked using the computer, such as to maintain historical records and relate them back to particular operations.

Any fill sensor capable of producing an output signal when filling particulates reach the threshold fill location or other location of interest may be suitable for use in the embodiments herein. Such fill sensors may be mechanical (e.g., a switch that physically moves when the particulates reach the threshold fill location), electrical, interference-based (e.g., a beam or wave that is interrupted when the particulates reach the threshold fill location), and the like. Combinations of these may also be suitable, such as to enhance the sensitivity of the fill sensor. Examples of specific sensors may include, but are not limited to, a frequency sensor, a sonar sensor (e.g., ultrasonic sensor), a radar sensor, an acoustic sensor, an infrared sensor, an x-ray sensor, an optical sensor, a diaphragm switch sensor, a paddle sensor, a tilt sensor, a capacitive sensor, and any combination thereof.

As depicted in FIG. 2, two fill sensors 206 are located in each bin of the material storage unit 200. However, it will be appreciated that one or greater than two (e.g., three, four, five, six, seven, eight, nine, ten, or even more) may be located in each bin, and may be located either all on one or more angular air flow vents, all on one or more locations on the sidewall of the bin, or any combination thereof. For example, when more than one fill sensor 206 is located in a bin, the location of the fill sensor 206 on the sidewall or angular air flow vent may be strategically selected. For example, a first sensor 206 may be located at a first location to alert an operator as to the filling location of particulates and a second fill sensor 206 may be located at the threshold fill location to alert an operator to perform a particular operation (e.g., to cease filling operations). Moreover, any number of fill sensors 206 may be located between the first and second fill sensor 206, without departing from the scope of the present disclosure, such as to determine a fill gradient of particulates in the material storage unit. Furthermore, the use of multiple fill sensors 206 may be strategically used such that initial fill sensors 206 only output to a computer for historical recording and the fill sensor 206 located at the threshold fill location alerts an operator. Other combinations of fill sensors may also be used in accordance with the embodiments of the present disclosure.

With continued reference to FIG. 2, each of the one or more bins, as discussed with reference to FIG. 1, may further comprise a discharge outlet 208 extending through the bottom end of the bin and in fluid communication with the interior of the bin. The discharge outlet 208 may be used to remove all or a portion of the particulates from the interior of one or more bins. That is, in some instances, particulates from only one, a combination, or all bins may be discharged through the discharge outlet 208. As depicted, the discharge outlet may be in the form of a shaped opening in the bottom end of the bin, such as a full opening or a gate that can close and open varying amounts. In other embodiments, the discharge outlet 208 may be substantially similar to the fill line inlet 206 in that it has two ends, one in communication with the interior of the bin and another in communication with the exterior of the bin for discharging the particulates from the interior. Other configurations may also be possible, without departing from the scope of the present disclosure.

Figure 3A:
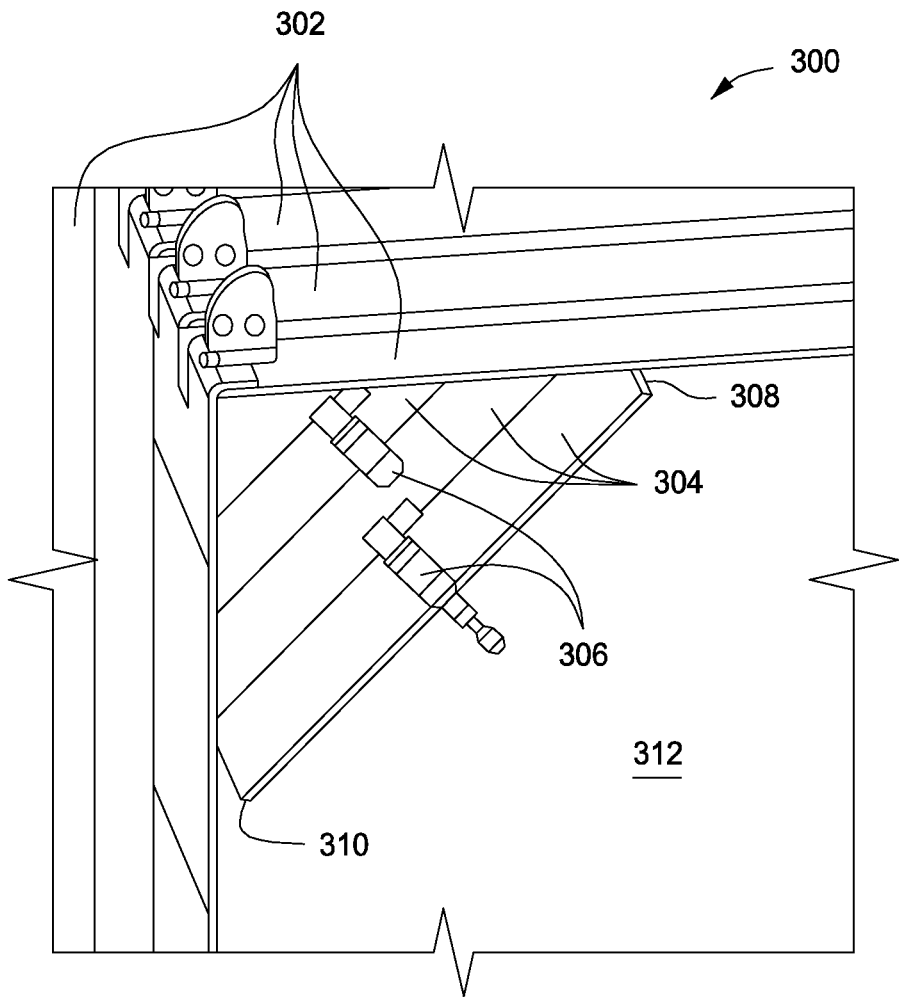
FIG. 3A illustrates a cut-away, collapsed view of a portion of a material storage unit having angular air flow ventilation and fill sensors according to one or more embodiments of the present disclosure.
Figure 3B:
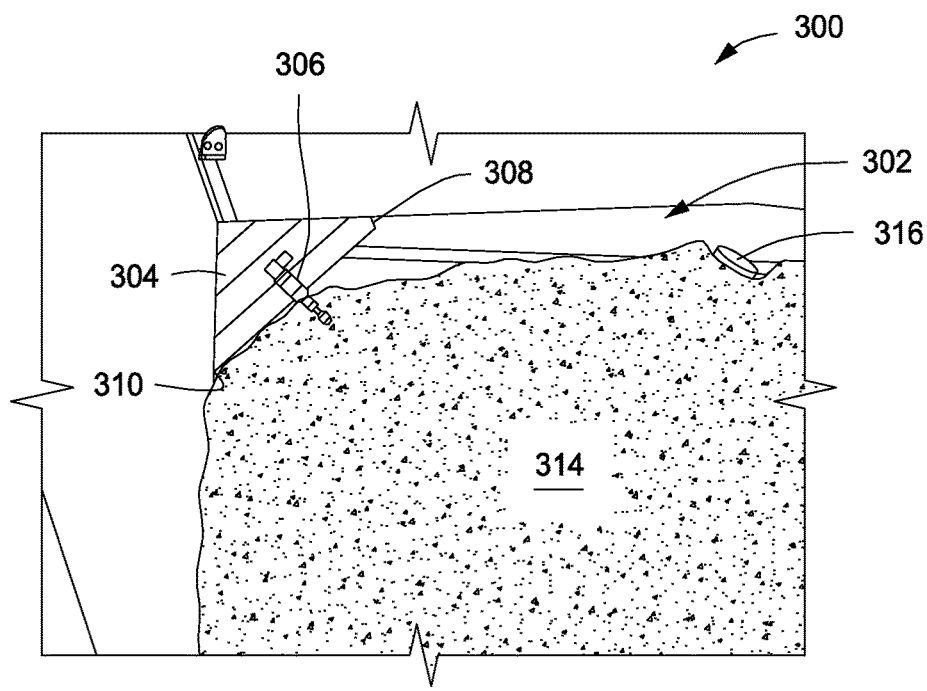
FIG. 3B illustrates a cut-away view of a portion of a material storage unit having angular air flow ventilation and fill sensors during a filling operation according to one or more embodiments of the present disclosure.

Referring now to FIGS. 3A and 3B, illustrated is a cut-away, collapsed view of a material storage unit 300 according to one or more embodiments herein. As depicted in FIG. 3A, four separate bins 302 are shown collapsed together to illustrate the configuration and air flow path of the angular air flow vents 304 forming the venting mechanism described herein. As shown, the angular air flow vents 304 have a top air inlet 308 and a bottom air inlet 310, wherein the top air inlet 308 is angled away from the sidewall of the bin. Air is able to freely flow between each of the top air inlet 308, the bottom air inlet 310, and the interior 312 of each of the bins 302 of the material storage unit 300. Such air flow reduces the dust generated in the material storage unit 300 that escapes through hatches (not shown) or other openings in the material storage unit 300 and into the atmosphere. As illustrated, each of the angular air flow vents 304 in FIG. 3A, further comprise a fill sensor 306 located thereon, which may be any of the fill sensor types previously discussed herein.

Referring now to FIG. 3B, with continued reference to FIG. 3A, the material storage unit 300 is shown having particulates 314 filled therein. The particulates 314 enter into the bin 302 through one or more fill line inlets 316 (one shown) extending from the bottom of the bin 302. It will be appreciated that the fill line inlet 316 generally may extend from either or both of the bottom end of the bin 302 or the sidewall of the bin 302 and be in fluid communication with the interior 312 (FIG. 3A) thereof, without departing from the scope of the present disclosure. Generally, each bin 302 in a material storage unit 300 will have at least one fill line inlet 316, and generally not more than four fill line inlets 316 per bin.

As the particulates 314 fill into the interior 312 of the bin 302 through the fill line inlet 316, the particulates accumulate toward a threshold fill location, which may be designated using a fill sensor 306, and which as shown is located on the angular air flow vent 304. Upon the particulates 314 activating the fill sensor 306, an output signal is generated by the sensor 306, as previously described. The output signal may trigger automatically or by virtue of alerting an operator that the particulates 314 have reached the threshold fill location and filling operations into the material storage unit 300 or a bin thereof should cease. An advantage of the present disclosure is that in the event of overfilling, air is still maintained through at east the top air inlet 308 of the angular air flow vent 306.

Figure 3C:
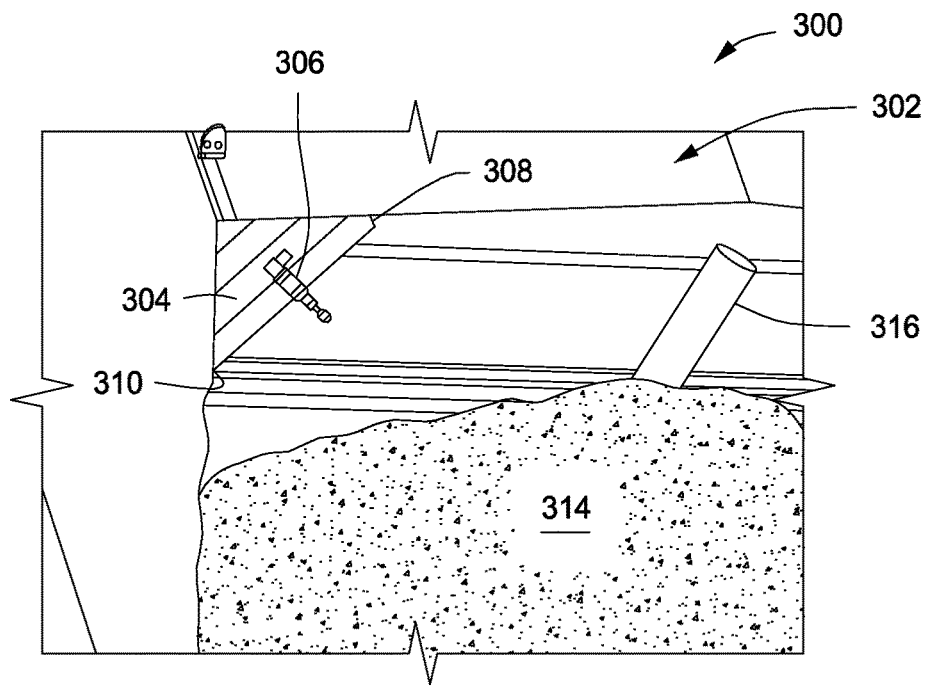
FIG. 3C illustrates a cut-away view of a portion of a material storage unit having angular air flow ventilation and fill sensors for use in preventing overfilling according to one or more embodiments of the present disclosure

Referring now to FIG. 3C, with continued reference to FIGS. 3A and 3B, another advantage of the venting mechanism comprising the angular air flow vents described herein is that the bottom air inlet 310 of the angular air flow vent 306 and the angular nature of the angular air flow vent 306 may serve as a means to prevent overfilling of the particulates 314 that have accumulated on the angular air flow vent 306 or otherwise above the threshold fill location back into the interior 312 (FIG. 3A) of the bin 302, without having to expose an operator to the interior 312 of the bin 302. The overfilling path of the embodiments herein allow the particulates 314 slide down the angular air flow vent 306 and out the bottom air inlet 310 to the interior of the bin 302 (see also FIG. 3A). That is, in the event of failure to cease operations when the threshold fill location is reached (e.g., operator error, and the like), the bottom air inlet 310 allows the particulates 314 to be removed therethrough as the particulates are discharged from the material storage unit 300 through a discharge outlet, described in more detail below. Accordingly, the angular air flow vent 306 is both a dust control mechanism and an overfill mechanism.

To facilitate the function of the angular air flow vent 306, the angular air flow vent 306 may form an angle of between a lower limit of about 25°, 30°, 35°, 40°, 45°, 50°, 55°, and 60° to an upper limit of about 90°, 85°, 80°, 75°, 70°, and 60° relative to the bottom end of the bin, encompassing any value and subset therebetween. Generally, it may be desirable that the angular air flow vent 306 form an angle that exceeds the angle of repose for the particulate within the bin 302 of the material storage unit 300. When the particulate is natural proppant, the angle of repose may be about 35°.

Embodiments disclosed herein include Embodiment A, Embodiment B, and Embodiment C.

Embodiment A

A material storage unit comprising: a bin having a bottom end, a top end, and a sidewall extending therebetween and defining an interior configured to hold particulates therein, wherein a portion of the sidewall defines an angular air flow vent having a top air inlet and a bottom air inlet, wherein the top air inlet is angled away from the sidewall, and wherein the top air inlet, the bottom air inlet, and the interior are in fluid communication; a fill line inlet extending through one or both of the bottom end of the bin or the sidewall of the bin and in fluid communication with the interior, wherein the fill line inlet has two ends, a first end of the fill line inlet located outside of the interior and configured to receive the particulates, and a second end of the fill line inlet located inside of the interior and configured to deposit the particulates into the interior; a venting outlet extending through one or both of the top end of the bin or the sidewall of the bin and in fluid communication with the interior, wherein the venting outlet has two ends, the first end of the venting outlet located outside of the interior and the second end of the venting outlet located inside of the interior, and both the first end of the venting outlet and second end of the venting outlet open to air flow; and a discharge outlet extending through the bottom end of the bin and in fluid communication with the interior, the discharge outlet configured to discharge the particulates from the interior.

Embodiment A may have one or more of the following additional elements in any combination:

Element A1: Further comprising a fill sensor disposed in the interior on the sidewall at a threshold fill location and configured to output an output signal when the particulates reach the threshold fill location.

Element A2: Further comprising a fill sensor disposed in the interior on the sidewall at a threshold fill location and configured to output an output signal when the particulates reach the threshold fill location, wherein the fill sensor is selected from the group consisting of a frequency sensor, a sonar sensor, a radar sensor, an acoustic sensor, an infrared sensor, an x-ray sensor, an optical sensor, a diaphragm switch sensor, a paddle sensor, a tilt sensor, a capacitive sensor, and any combination thereof.

Element A3: Further comprising a fill sensor disposed in the interior on the sidewall at a threshold fill location and configured to output an output signal when the particulates reach the threshold fill location, wherein the output signal is selected from the group consisting of a visual output signal, an audible output signal, a detectable electronic signal, and any combination thereof.

Element A4: Wherein the first end of the venting outlet is connected to a vacuum source.

Element A5: Wherein the angular air flow vent forms an angle of between about 25° to about 90° relative to the bottom end of the bin.

Element A6: Further comprising a fill sensor disposed on the angular air flow vent at a threshold fill location and configured to output an output signal when the particulates reach the threshold fill location.

By way of non-limiting example, exemplary combinations applicable to Embodiment A include: A with A1 and A2; A with A1 and A3; A with A1 and A4; A with A1 and A5; A with A1 and A6; A with A2 and A3; A with A2 and A4; A with A2 and A5; A with A2 and A6; A with A3 and A4; A with A3 and A5; A with A3 and A6; A with A4 and A5; A with A4 and A6; A with A5 and A6; A with A1, A2, and A3; A with A3, A4, and A5; A with A1, A3, and A6; A with A1, A2, A3, and A4; A with A1, A2, A3, A4, and A4; A with A1, A2, A3, A4, A5, and A6.

Embodiment B

A method comprising: providing a material storage unit comprising: a bin having a bottom end, a top end, and a sidewall extending therebetween and defining an interior configured to hold particulates therein, a fill line inlet extending through one or both of the bottom end of the bin or the sidewall of the bin and in fluid communication with the interior, wherein the fill line inlet has two ends, a first end of the fill line inlet located outside of the interior and configured to receive the particulates, and a second end of the fill line inlet located inside of the interior and configured to deposit the particulates into the interior; a venting outlet extending through one or both of the top end of the bin or the sidewall of the bin and in fluid communication with the interior, wherein the venting outlet has two ends, the first end of the venting outlet located outside of the interior and the second end of the venting outlet located inside of the interior, and both the first end of the venting outlet and second end of the venting outlet open to air flow; a fill sensor disposed in the interior on the sidewall at a threshold fill location and configured to output an output signal when the particulates reach the threshold fill location; and a discharge outlet extending through the bottom end of the bin and in fluid communication with the interior, the discharge outlet configured to discharge the particulates from the interior; filling the interior with particulates through the fill line inlet to the threshold fill location, wherein the particulates are received from outside of the interior through the first end of the fill line inlet and filled into the interior through the second end of the fill line inlet; triggering the fill sensor; and outputting the output signal.

Embodiment B may have one or more of the following additional elements in any combination:

Element B1: Further comprising discharging at least a portion of the particulates through the discharge outlet.

Element B2: Further comprising detecting the output signal, wherein the output signal is selected from the group consisting of a visual output signal, an audible output signal, a detectable electronic signal, and any combination thereof.

Element B3: Further comprising detecting the output signal, and ceasing filling the interior with the particulates upon detecting the output signal.

Element B4: Further comprising pulling a vacuum by connecting the first end of the venting outlet to a vacuum source.

Element B5: Further comprising venting air through an angular air flow vent defined by a portion of the sidewall, wherein the angular air flow vent has a top air inlet and a bottom air inlet, the top air inlet being angled away from the sidewall, and wherein the top air inlet, the bottom air inlet, and the interior are in fluid communication.

Element B6: Further comprising pulling a vacuum by connecting the first end of the venting outlet to a vacuum source; and venting air through an angular air flow vent defined by a portion of the sidewall, wherein the angular air flow vent has a top air inlet and a bottom air inlet, the top air inlet being angled away from the sidewall, and wherein the top air inlet, the bottom air inlet, and the interior are in fluid communication.

By way of non-limiting example, exemplary combinations applicable to Embodiment B include: B with B1 and B2; B with B1 and B3; B with B1 and B4; B with B1 and B5; B with B1 and B6; B with B2 and B3; B with B2 and B4; B with B2 and B5; B with B2 and B6; B with B3 and B4; B with B3 and B5; B with B3 and B6; B with B4 and B5; B with B4 and B6; B with B5 and B6; B with B1, B2, and B5; B with B1, B3, and B4; B with B2, B4, and B6; B with B1, B2, B3, and B4; B with B1, B2, B3, B4, and B5; B with B1, B2, B3, B4, B5, and B6.

Embodiment C

A system comprising: a material storage unit positioned at a surface location adjacent to a wellbore in a subterranean formation, the wellbore having a tubular extending therein for introducing particulates from the material storage unit into the wellbore, and the material storage unit comprising: a bin having a bottom end, a top end, and a sidewall extending therebetween and defining an interior configured to hold the particulates therein, a fill line inlet extending through one or both of the bottom end of the bin or the sidewall of the bin and in fluid communication with the interior, wherein the fill line inlet has two ends, a first end of the fill line inlet located outside of the interior and configured to receive the particulates, and a second end of the fill line inlet located inside of the interior and configured to deposit the particulates into the interior; a venting outlet extending through one or both of the top end of the bin or the sidewall of the bin and in fluid communication with the interior, wherein the venting outlet has two ends, the first end of the venting outlet located outside of the interior and the second end of the venting outlet located inside of the interior, and both the first end of the venting outlet and second end of the venting outlet open to air flow; a fill sensor disposed in the interior on the sidewall at a threshold fill location and configured to output an output signal when the particulates reach the threshold fill location; and a discharge outlet extending through the bottom end of the bin and in fluid communication with the interior, the discharge outlet configured to discharge the particulates from the interior.

Embodiment C may have one or more of the following additional elements in any combination:

Element C1: Wherein the fill sensor is selected from the group consisting of a frequency sensor, a sonar sensor (e.g., ultrasonic sensor), a radar sensor, an acoustic sensor, an infrared sensor, an x-ray sensor, an optical sensor, a diaphragm switch sensor, a paddle sensor, a tilt sensor, a capacitive sensor, and any combination thereof.

Element C2: Wherein the output signal is selected from the group consisting of a visual output signal, an audible output signal, a detectable electronic signal, and any combination thereof.

Element C3: Wherein the first end of the venting outlet is connected to a vacuum source.

Element C4: Wherein a portion of the sidewall defines an angular air flow vent having a top air inlet and a bottom air inlet, wherein the top air inlet is angled away from the sidewall, and wherein the top air inlet, the bottom air inlet, and the interior are in fluid communication.

Element C5: Wherein a portion of the sidewall defines an angular air flow vent having a top air inlet and a bottom air inlet, wherein the top air inlet is angled away from the sidewall, and wherein the top air inlet, the bottom air inlet, and the interior are in fluid communication, and wherein the fill sensor is located on the angular air flow vent.

Element C6: Wherein a portion of the sidewall defines an angular air flow vent having a top air inlet and a bottom air inlet, wherein the top air inlet is angled away from the sidewall, and wherein the top air inlet, the bottom air inlet, and the interior are in fluid communication, and wherein the angular air flow vent forms an angle of between about 25° to about 90° relative to the bottom end of the bin.

By way of non-limiting example, exemplary combinations applicable to Embodiment C include: C with C1 and C2; C with C1 and C3; C with C1 and C4; C with C1 and C5; C with C1 and C6; C with C2 and C3; C with C2 and C4; C with C2 and C5; C with C2 and C6; C with C3 and C4; C with C3 and C5; C with C3 and C6; C with C4 and C5; C with C4 and C6; C with C5 and C6; C with C1, C3, and C5; C with C1, C2, and C4; C with C2, C5, and C6; C with C1, C2, C3, and C4; C with C1, C2, C3, C4, and C5; C with C1, C2, C3, C4, C5, and C6.

Therefore, the present disclosure is well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A material storage unit comprising:
   a bin having a bottom end, a top end, and a sidewall extending therebetween and defining an interior configured to hold particulates therein,
   wherein a portion of the sidewall defines an angular air flow vent having a top air inlet and a bottom air inlet,
      wherein the top air inlet is angled away from the sidewall, and
      wherein the top air inlet, the bottom air inlet, and the interior are in fluid communication;
   a fill line inlet extending through one or both of the bottom end of the bin or the sidewall of the bin and in fluid communication with the interior,
      wherein the fill line inlet has two ends, a first end of the fill line inlet located outside of the interior and configured to receive the particulates, and a second end of the fill line inlet located inside of the interior and configured to deposit the particulates into the interior;
   a venting outlet extending through one or both of the top end of the bin or the sidewall of the bin and in fluid communication with the interior,
      wherein the venting outlet has two ends, the first end of the venting outlet located outside of the interior and the second end of the venting outlet located inside of the interior, and both the first end of the venting outlet and second end of the venting outlet open to air flow;
   wherein the air flow is either channeled to or from at least one other bin of a plurality of bins through the angular airflow vent; and
   a discharge outlet extending through the bottom end of the bin and in fluid communication with the interior, the discharge outlet configured to discharge the particulates from the interior.

2. The material storage unit of claim 1, further comprising a fill sensor disposed in the interior on the sidewall at a threshold fill location and configured to output an output signal when the particulates reach the threshold fill location.

3. The material storage unit of claim 2, wherein the fill sensor is selected from the group consisting of a frequency sensor, a sonar sensor, a radar sensor, an acoustic sensor, an infrared sensor, an x-ray sensor, an optical sensor, a diaphragm switch sensor, a paddle sensor, a tilt sensor, a capacitive sensor, and any combination thereof.

4. The material storage unit of claim 2, wherein the output signal is selected from the group consisting of a visual output signal, an audible output signal, a detectable electronic signal, and any combination thereof.

5. The material storage unit of claim 1, wherein the first end of the venting outlet is connected to a vacuum source.

6. The material storage unit of claim 1, wherein the angular air flow vent forms an angle of between about 25° to about 90° relative to the bottom end of the bin.

7. The material storage unit of claim 1, further comprising a fill sensor disposed on the angular air flow vent at a threshold fill location and configured to output an output signal when the particulates reach the threshold fill location.

8. A method comprising:
   providing a material storage unit comprising:
      a bin having a bottom end, a top end, and a sidewall extending therebetween and defining an interior configured to hold particulates therein,
      a fill line inlet extending through one or both of the bottom end of the bin or the sidewall of the bin and in fluid communication with the interior,
         wherein the fill line inlet has two ends, a first end of the fill line inlet located outside of the interior and configured to receive the particulates, and a second end of the fill line inlet located inside of the interior and configured to deposit the particulates into the interior;
      a venting outlet extending through one or both of the top end of the bin or the sidewall of the bin and in fluid communication with the interior,
         wherein the venting outlet has two ends, the first end of the venting outlet located outside of the interior and the second end of the venting outlet located inside of the interior, and both the first end of the venting outlet and second end of the venting outlet open to air flow;
      wherein the air flow is either channeled to or from at least one other bin of a plurality of bins through the angular airflow vent;
      a fill sensor disposed in the interior on the sidewall at a threshold fill location and configured to output an output signal when the particulates reach the threshold fill location; and
      a discharge outlet extending through the bottom end of the bin and in fluid communication with the interior, the discharge outlet configured to discharge the particulates from the interior;
   filling the interior with particulates through the fill line inlet to the threshold fill location,
      wherein the particulates are received from outside of the interior through the first end of the fill line inlet and filled into the interior through the second end of the fill line inlet;
   triggering the fill sensor; and
   outputting the output signal.

9. The method of claim 8, further comprising discharging at least a portion of the particulates through the discharge outlet.

10. The method of claim 8, further comprising detecting the output signal,
wherein the output signal is selected from the group consisting of a visual output signal, an audible output signal, a detectable electronic signal, and any combination thereof.

11. The method of claim 10, further comprising ceasing filling the interior with the particulates upon detecting the output signal.

12. The method of claim 8, further comprising pulling a vacuum by connecting the first end of the venting outlet to a vacuum source.

13. The method of claim 8, further comprising venting air through an angular air flow vent defined by a portion of the sidewall,
wherein the angular air flow vent has a top air inlet and a bottom air inlet, the top air inlet being angled away from the sidewall, and
wherein the top air inlet, the bottom air inlet, and the interior are in fluid communication.

14. The method of claim 8, further comprising pulling a vacuum by connecting the first end of the venting outlet to a vacuum source; and
venting air through an angular air flow vent defined by a portion of the sidewall,
wherein the angular air flow vent has a top air inlet and a bottom air inlet, the top air inlet being angled away from the sidewall, and
wherein the top air inlet, the bottom air inlet, and the interior are in fluid communication.

15. A system comprising:
a material storage unit positioned at a surface location adjacent to a wellbore in a subterranean formation, the wellbore having a tubular extending therein for introducing particulates from the material storage unit into the wellbore, and the material storage unit comprising:
a bin having a bottom end, a top end, and a sidewall extending therebetween and defining an interior configured to hold the particulates therein,
a fill line inlet extending through one or both of the bottom end of the bin or the sidewall of the bin and in fluid communication with the interior,
wherein the fill line inlet has two ends, a first end of the fill line inlet located outside of the interior and configured to receive the particulates, and a second end of the fill line inlet located inside of the interior and configured to deposit the particulates into the interior;
a venting outlet extending through one or both of the top end of the bin or the sidewall of the bin and in fluid communication with the interior,
wherein the venting outlet has two ends, the first end of the venting outlet located outside of the interior and the second end of the venting outlet located inside of the interior, and both the first end of the venting outlet and second end of the venting outlet open to air flow;
wherein the air flow is either channeled to or from at least one other bin of a plurality of bins through the angular airflow vent;
a fill sensor disposed in the interior on the sidewall at a threshold fill location and configured to output an output signal when the particulates reach the threshold fill location; and
a discharge outlet extending through the bottom end of the bin and in fluid communication with the interior, the discharge outlet configured to discharge the particulates from the interior.

16. The system of claim 15, wherein the fill sensor is selected from the group consisting of a frequency sensor, a sonar sensor (e.g., ultrasonic sensor), a radar sensor, an acoustic sensor, an infrared sensor, an x-ray sensor, an optical sensor, a diaphragm switch sensor, a paddle sensor, a tilt sensor, a capacitive sensor, and any combination thereof.

17. The system of claim 15, wherein the output signal is selected from the group consisting of a visual output signal, an audible output signal, a detectable electronic signal, and any combination thereof.

18. The system of claim 15, wherein the first end of the venting outlet is connected to a vacuum source.

19. The system of claim 15, wherein a portion of the sidewall defines an angular air flow vent having a top air inlet and a bottom air inlet,
wherein the top air inlet is angled away from the sidewall, and
wherein the top air inlet, the bottom air inlet, and the interior are in fluid communication.

20. The system of claim 19, wherein the fill sensor is located on the angular air flow vent.

* * * * *